US009141616B2

(12) United States Patent
Britt, Jr. et al.

(10) Patent No.: US 9,141,616 B2
(45) Date of Patent: Sep. 22, 2015

(54) PHYSICAL CONFIRMATION FOR NETWORK-PROVIDED CONTENT

(75) Inventors: Joe Freeman Britt, Jr., Los Altos, CA (US); Richard Scott Bartlett, Oakland, CA (US); Eugene Koh, San Francisco, CA (US); Matt Hershenson, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 271 days.

(21) Appl. No.: 13/463,456

(22) Filed: May 3, 2012

(65) Prior Publication Data

US 2012/0311723 A1   Dec. 6, 2012

Related U.S. Application Data

(60) Provisional application No. 61/483,557, filed on May 6, 2011.

(51) Int. Cl.

| G06F 15/16 | (2006.01) |
| G06F 17/30 | (2006.01) |
| G06Q 30/06 | (2012.01) |
| G11B 20/00 | (2006.01) |
| G11B 27/10 | (2006.01) |
| G11B 27/11 | (2006.01) |

(52) U.S. Cl.
CPC .......... *G06F 17/30023* (2013.01); *G06Q 30/06* (2013.01); *G11B 20/00862* (2013.01); *G11B 20/00869* (2013.01); *G11B 27/10* (2013.01); *G11B 27/11* (2013.01); *G11B 2220/2545* (2013.01); *G11B 2220/2562* (2013.01); *G11B 2220/65* (2013.01); *G11B 2220/652* (2013.01)

(58) Field of Classification Search
CPC ................... G11B 20/00862; G11B 20/00869
See application file for complete search history.

(56) References Cited

U.S. PATENT DOCUMENTS

| 7,021,534 B1 * | 4/2006 | Kiliccote ...................... 235/380 |
| 7,668,754 B1 * | 2/2010 | Bridgelall ..................... 705/26.9 |
| 8,385,912 B2 * | 2/2013 | Rolf ............................ 455/426.1 |
| 8,589,305 B2 * | 11/2013 | Shintani .......................... 705/59 |
| 2004/0103217 A1 * | 5/2004 | Kridner ......................... 709/247 |

(Continued)

FOREIGN PATENT DOCUMENTS

| WO | 2005/081087 | 9/2005 |
| WO | 2009/141649 | 11/2009 |

OTHER PUBLICATIONS

International Preliminary Report on Patentability & Written Opinion for Application No. PCT/US2012/036494, dated Nov. 21, 2013, 7 pages.

(Continued)

*Primary Examiner* — Matthew Henning
(74) *Attorney, Agent, or Firm* — Fish & Richardson P.C.

(57) ABSTRACT

A computer-implemented method includes receiving, from a remote communication device and at a server system, information that indicates a unique identifier for a physical item that corresponds to media content, the identifier differing from identifiers for other physical items that correspond to the same content; associating the received information with an account of a first user of a hosted internet service; and subsequently providing, by the hosted internet service, content that matches the content that corresponds to the physical item, based on a determination that the received information authorizes the first user to obtain the content provided by the hosted internet service.

18 Claims, 8 Drawing Sheets

(56) References Cited

U.S. PATENT DOCUMENTS

| | | | |
|---|---|---|---|
| 2004/0254887 A1* | 12/2004 | Jacoby | 705/52 |
| 2004/0260665 A1* | 12/2004 | Hamilton | 706/45 |
| 2007/0272738 A1* | 11/2007 | Berkun | 235/380 |
| 2007/0282201 A1* | 12/2007 | Kim | 600/437 |
| 2010/0002606 A1* | 1/2010 | Preis et al. | 370/259 |
| 2010/0325182 A1 | 12/2010 | Ganz | |
| 2012/0268563 A1* | 10/2012 | Chou et al. | 348/46 |

OTHER PUBLICATIONS

International Search Report & Written Opinion for Application No. PCT/US2012/036494, dated Jul. 25, 2012, 10 pages.

* cited by examiner

PHYSICAL CONFIRMATION FOR NETWORK-PROVIDED CONTENT

CROSS-REFERENCE TO RELATED APPLICATION

This application claims priority to U.S. Provisional Application Ser. No. 61/483,557, filed on May 6, 2011, entitled "Physical Confirmation For Network-Proved Content," the entire contents of which are hereby incorporated by reference.

TECHNICAL FIELD

This document relates generally to mechanisms for providing electronic content (e.g., streaming music and video) over a network, and to techniques for confirming an ability of a user to receive the content.

BACKGROUND

The mechanisms by which people consume content have changed a great deal in recent years. Until recently, books were purchased and read in paper form (typically from a local bookstore); music was listened to via vinyl LP, plastic 8-track or cassette tape, or later digital compact disc (CD); and audio-video was generated via film projector, videocassette, or later digital versatile disc (DVD). Each of these types of content is now frequently obtained in a virtual, electronic format rather than a physical format—books as PDF's or other forms of e-books, music as MP3 files, and audio-visual programs as various forms of digital files. Such content can, in certain circumstances, be fully downloaded from a server system to a client, and then viewed on the client. In other situations, only a portion of the content may be downloaded to the client device—just ahead of the portion that is being presented—in a streaming media format.

Such content delivery systems often fail to provide a satisfying experience for user and for content providers. Content providers may impose digital rights management (DRM) limits on the use of their content to prevent improper use. That may result in a user having to buy a standard-definition copy of a movie and a high-definition copy, in addition to buying a downloaded copy, e.g., if the user wants to watch the movie on his home theatre system (high-definition), portable video players (regular-definition), or smartphone (downloaded copy). Sometimes a user can buy content and be provided with multiple forms of the content, so that the user can enjoy it in different contexts. For example, certain movies are packaged to include a high-definition disk, a regular definition disk, and an electronic file of the movie. Also, some distribution systems, such as individual song downloads are not acceptable to certain artists because they want fans to be presented with an entire contiguous album of music, and with lyric sheets or other items that are important for understanding the artistry of the music.

SUMMARY

This document describes systems and techniques for delivering content from an internet-connected hosted server system to various client computing devices—a so-called cloud-based delivery system. In a cloud-based system, users may simply subscribe to receive an unlimited amount of content for a monthly fee, or users may be allowed to stream only content they purchased from the particular cloud-based service or from elsewhere. The techniques and systems described here permit a user to obtain cloud-based access to content that the user has purchased and which she possesses in physical form—e.g., as a paper book, a CD, or a DVD. To implement such access, the physical version of the content, in the form of a physical item (e.g., a jewel case containing a CD disc), may be encoded with a unique identifier and an owner of the item can capture the unique identifier. Such capture may occur by exposing the physical item to an electronic device, which can read the identifier, e.g., by one or more of a near-field communication (NFC), optical scanning (e.g., QR code), or other mechanism for acquiring identifying information for the item. The identifying information may then be sent to a networked content provisioning system (e.g., a cloud-based media service) along with information that identifies the topic of the content, and the system may associate the particular identified item of the content with an account for the user so that the user can later stream a different copy of the content, or related content, from the system even if the user does not have ready access to the physical item at the time (e.g., if the user is traveling in her car).

Such systems and techniques may, in certain implementations, provide one or more advantages. For example, as noted above, a user may be enabled to listen to her music collection or read her favorite books in various manners and in various settings—e.g., from a high-quality Blu Ray DVD when at home, and from a lower-quality streaming video feed while on the road. The use and tracking of identifying information for particular physical items may be used to ensure that no two users are trying to access the cloud-based resources by sharing a single physical item. Also, a "roving license" for streaming content may be implemented in which there is a physical chain of custody—i.e., scanning of the physical item causes the license and the ability to access the cloud-based content to be transferred to a user who scanned the item (e.g., a friend or someone to whom the first user sold her copy of the content). Such security may make producers of content more comfortable in providing their work to the cloud-based system, and may also give the more artistic producers of content an assurance that users have been presented with the full physical item, where such presentation may be considered very important for artistic reasons (e.g., the artist wants the consumer to own an entire album because the songs together tell a story, or liner notes and images are considered an important part of the fan experience).

In one aspect of the present disclosure, a computer-implemented method for electronic content management is disclosed. The method comprises receiving, from a remote communication device and at a server system, information that indicates a unique identifier for a physical item that corresponds to media content, the identifier differing from identifiers for other physical items that correspond to the same content; associating the received information with an account of a first user of a hosted internet service; and subsequently providing, by the hosted internet service, content that matches the content that corresponds to the physical item, based on a determination that the received information authorizes the first user to obtain the content provided by the hosted internet service. The content can comprise content selected from a group consisting of electronic books, electronic music files, and electronic audio-visual files. Also, the physical item that presents the content can comprise a paper book, a music CD, or a DVD. The method may also include determining whether the unique identifier has been provided by another user of the hosted internet service, and identifying that the received information authorizes the first user to obtain the content provided by the hosted internet service if the unique identifier has not been provided by another user.

In some aspects, if the unique identifier has been provided by another user, the method can further include requesting that the other user again provide the information that indicates the unique identifier for the physical item to establish that the other user still possesses the physical item. Moreover, the information that indicates a unique identifier for the physical item can comprise a combination of multiple different information sources on the physical item, and more particularly an ID from a near-field communications device on the physical item and information from an image of the physical item.

In another implementation, a computer-implemented method for electronic content management is disclosed that comprises exposing a piece of physical media that contains content to an network-connected electronic computing device; transmitting, from the electronic computing device to a server system for a hosted internet service, information that uniquely identifies the piece of physical media from other pieces of physical media that contain the same or similar content; subsequently requesting, by the electronic computing device and from the hosted internet service, served content that matches the content on the physical media; and receiving the served content based on a determination by the hosted internet service that the information that uniquely identifies the piece of physical media has not been provided by other user of the hosted internet service. The served content can comprise streamed media content. The method can also include receiving a request from the hosted internet service to expose the piece of physical media to the electronic device again to confirm the user's possession of the piece of physical media.

In addition, exposing the piece of physical media to the electronic computing device can comprise bringing the piece of physical media within range of a near-field communication sensor in the electronic computing device and can further comprise capturing an image of at least part of the piece of physical media with the electronic computing device. The method can also include generating an identifier for the piece of physical media using a combination of multiple distinct and different information sources on the item. Moreover, the piece of physical media can comprise a data holding piece of media and a storage item for the data holding piece of media.

In yet another implementation, a computer-implemented system for electronic content management is disclosed. The system comprises a web interface arranged to receive, from remote computing devices, information that uniquely identifies pieces of media proximate to the remote computing devices; a data store associated with a content providing service, the data store correlating information that identifies particular pieces of media with particular user accounts; and a media server that is part of the content providing service and is programmed to provide content in response to user requests, based on determinations that requesting users have previously provided information that uniquely identifies pieces of media for the requested content, and that other users have not. The media server can be programmed to compare identifying information obtained with electronic devices by the users and from physical items, with identifying information stored in the data store, and to request, if information that uniquely identifies a piece of media has been provided by another user, that the other user again provide the information that indicates the unique identifier for the physical item to establish that the other user still possesses the physical item.

In some aspects, the information that uniquely identifies a particular piece of media comprises a combination of multiple different information sources physically placed on the piece of media including on packaging, and can comprise at least an ID from a near-field communications device on the physical item and information from an image of the physical item.

All or part of the foregoing may be implemented as a computer program product including instructions that are stored on one or more non-transitory machine-readable storage media, and that are executable on one or more processing devices. All or part of the foregoing may also be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
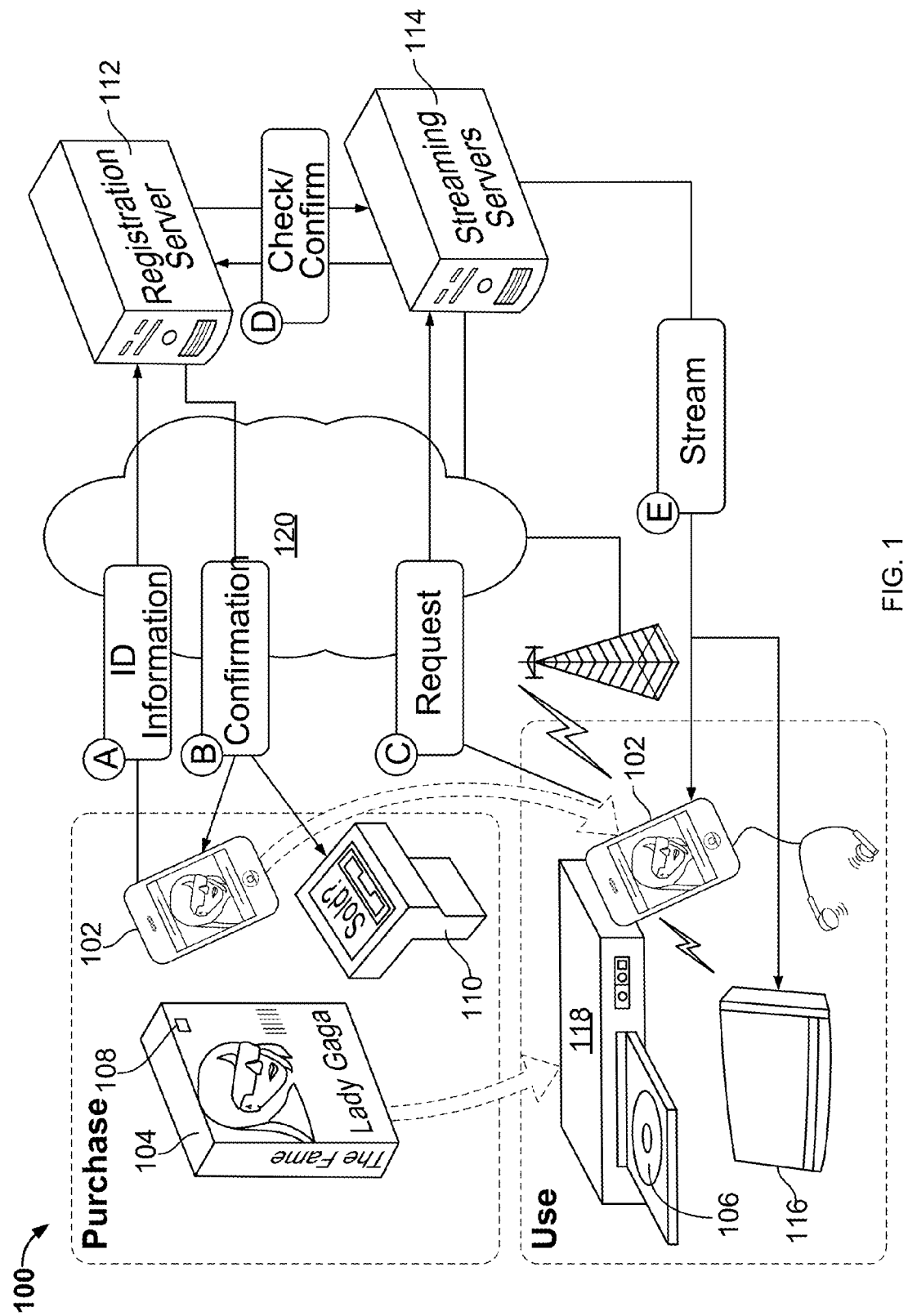
FIG. 1 is a conceptual flow diagram of a system that makes on-line content available based on verification using a physical item.

FIG. 1 is a conceptual flow diagram of a system 100 that makes on-line content available based on verification using a physical item. In general, the system ties access to content that is delivered over a network to a user's ability to present, to their smartphone or other computing device, a physical item that is in their possession and that has been marked with identifying indicia, so as to certify that the user should be licensed and given access to on-line versions of the content.

The figure generally shows two stages in a user's interaction with a piece of media, in this case, an album by lady gaga—a purchase stage during which the user establishes a right to access the on-line content, and a use stage during which the user accesses the content. In the upper left corner, a mobile device 102 that a user owns is being swiped past a near field communication (NFC) chip or tag that is embedded in packaging 104 for a CD for a Lady Gaga album. Such an action may cause the mobile device 102 to energize the NFC chip 108 and obtain an identifying number from the chip 108. For example, each CD package in a run from the publisher may have been energized before it left the publisher, so as to have a unique identifying number encoded in the chip 108. Alternatively, a QR Code or similar code may be imprinted on the packaging and can be exposed to a camera ion the device 102, where the device itself may decode the QR Code or may send an image to a remote server system for decoding. Again, the QR Code may identify the content on the CD and may also encode a unique identifying number for the CD.

By scanning the chip 108, a user of the mobile device 102 may be identifying themselves to a central set of servers as the rightful owner of the media item in the packaging 104, and thus the proper recipient of a license to listen to on-line content that is identical to, or essentially the same as, the content on the media item. As discussed further below, such registration by a user may enable the user to obtain, in addition to the right to listen to the CD in a normal manner, an additional right to listen to other copies of the content that is on the CD from a different source, such as a cloud-based streaming music service. In addition, the user may be given access to other content that is identified in the system 100 as relating to the content on the media item. As one example, Lady Gaga may make recordings of each of her concerts, and may make available, for streaming over the internet, songs from the concerts for fans who can establish that they purchased physical media, such as CDs that have the studio versions of the same songs.

In this example, registration by the user occurs with a registration server system 112. The registration server system 112 may be operated by a record company that produced the media item, or by a third party music service, such as a service that obtains licenses from the record company and from other record companies to deliver electronic content for download to users, such as in downloaded and stored files or in streaming media. To obtain such registration, a user may cause the device 102 to send identification information, as shown by the arrow at the box labeled A, to the registration server 112. The identification information may include information that identifies the user, such as a user account number, and also information that identifies the particular media item. Information identifying the particular media item may include, for example, a unique identifying number that has been encoded in an NFC chip 108, and may additionally or alternatively include an image of the item captured by a camera on the device 102, where the image may include graphics from the item for verification by the registration server 112 and/or an image of a barcode where the registration server 112 may resolve the barcode into metadata that describes the item. For example, the barcode may identify which Lady Gaga album is represented in the item, and the encoded information on the NFC chip 108 may identify which copy of that album the user possesses. As such, the record company may only have to assign new set of unique numbers for each album that it produces, which would automatically allow it to distinguish from albums by other record companies, and avoid an accidental overlap in identification numbers. Alternatively, the NFC chip 108 may deliver a two-part encoded message, where a first part identifies the album, and the second part uniquely identifies which copy of that album is represented by the item.

The identification information may be sent from the device 102 to the registration server 112 in various formats and using various protocols. In one example, an item identifier and a user identifier may be combined, such as by concatenation, and may have a public key for the registration server 112 applied to them. In this manner, an interloper would not be able to intercept the transmission and obtain the identification information for the user or the item. The encrypted identification information may then be sent to the registration server, such as part of a URL in an HTTP or HTTPS request or SPDY communication from the device 102 to the registration server 112. The communication may also use an SSL socket for security purposes.

Upon receiving the encrypted information, the registration server 112 may use its private key to decrypt the information and may parse the received information apart to obtain the user identification and the item identification. The registration server 112 may then check its logs to determine whether anyone has previously registered the particular item, and if the item is not currently registered, the registration server 112 may send a confirmation to the device 102 so that a message may be provided to a user of the device 102 indicating that content associated with the item is now available for download (e.g., streaming) from the system 100.

In some implementations, such as when a buyer first registers the item, a confirmation message may also be sent to a retail terminal 110, such as a portable barcode scanner or other transaction device that a retail clerk may use for carrying out transactions. For example, the registration servers 112 may initially correlate a retailer, such as Best Buy, to the particular item. The user of device 102 may have learned that, in order to obtain online access to the content, she needs to transfer the registration before she leaves the Best Buy store. Thus, she can swipe her smartphone 102 past the package 104 while at the checkout, and a message may be sent to the clerk's device 110 so that the clerk may confirm that the user of smartphone 102 legitimately purchased the item and should have access to online versions of the content from the item. Thus, the clerk may respond affirmatively to the message, and registration server 112 may close the transaction by placing an identifier for the item in the media library for the user of device 102.

Mechanisms may also be provided on the media or packaging to prevent interlopers from "acquiring" control of a piece of media improperly, such as by surreptitiously exposing media on store shelves to their mobile telephone. Where the thing being exposed is a QR Code, the code may simply be hidden inside packaging that cannot be opened easily inside a store without being discovered, such as sealed plastic and other current jewel case packaging. Where the exposed object is an NFC tag, the tag can be shielded, whereby the shield can be removed only by opening the sealed packaging. Other mechanisms may also be employed to incapacitate the NFC tag in a manner that it can be activated only by opening the packaging. Ac combination may also be used, such as using a scan of a QR Code inside the packaging as a code to "unlock" the ability to retrieve content from the cloud, and the NFC tag used to further identify the content to be obtained and to identify that the particular piece of content is only in use by one party. The future ability to listen to the content may be triggered, e.g., by holding the jewel case containing the NFC tag up to a music player (as described in more detail below). Where adequate security is provided by such physical protections at the physical piece of media, the interaction with the registration server 112 can be altered or even removed.

The mechanisms described here may, in appropriate circumstances, be used to identify patterns and trends in sales and distribution of media. For example, sales may be "booked" for certain media when the media is registered with a cloud service, and decisions may be made around such data. As one example, media that is trending upward may be promoted more in areas in which it is deemed to be trending the most upward. Also, machines may be employed to generate high demand discs on-site, so that inventories of physical media can be quickly replenished.

Moving now to the "use" area of the figure, upon leaving the store, the user of device 102 may go to a friend's house for relaxation and may want to listen to her newly purchased music. Such interaction is shown by the dotted arrows moving downward from the purchase area in the upper left corner of the figure down to the lower left corner of FIG. 1. In a situation in which the package 104 included media that stores content, such as a CD 106, the user could place the CD 106 into a CD player 108 and listen to it in a traditional manner. The user may also, or alternatively (e.g., if the media the user purchased is just a booklet but does not contain physical media for playing the music), choose to stream the music over device 102. Thus, as shown by the arrow through the box labeled C, the smartphone 102 may make a request from a streaming server system 114 to have songs from the album streamed to or through the device 102 or to another device such as desktop stereo 116.

As shown on the screen of device 102, the user has launched a music playing application on the device 102 which generates the request. The request may be in the form, for example, of an HTTP request that identifies the media information that the user of device 102 would like to obtain. In one example, the information may simply be a catalog of songs that are available for streaming to the device 102, using the user's account with the streaming servers 114. In another example, the information may be the actual streaming media itself so that the user may listen to songs from their purchased album. To determine what music is in the user's library, and/or whether the user should have access to a particular song or other piece of media content, the streaming server system 114 send a communication, which may be in the form of a remote procedure call (RPC) or similar communication, to the registration server system 112. Such a request may simply include an identifier for the user, which may cause the registration server 112 to return a list of all media items to which the user should have access. Alternatively, the request may include an identifier for the user and an identifier for a particular piece of media content, and the registration server 112 may indicate whether the user should have access to that piece of media content. The determination of whether the user should have access may, in certain circumstances, involve a determination whether the user has previously submitted identifying information for a physical item in the manners discussed above. For example, as discussed above, the user may have previously scanned their device 102 across the NFC chip 108, and the registration server 112 may have registered that item and its corresponding content with the user's account if the registration server system 112 had not previously registered the item with another account.

Once the streaming server system 114 receives an affirmative response from the registration server system 112, as shown by the arrows and box D, the streaming server system 114 may stream the media content to the device 102, as shown at Box E. In some implementations, the device 102 may forward or redirect the streaming data to the device 116, using a Bluetooth or similar data connection. In another example, the device 102 may have been moved in close proximity to the desktop stereo 116, as a result of NFC structures in both devices previously causing one of the devices to identify the other device, such as by the desktop stereo 116 obtaining a user identifier of the device 102. Such interaction may cause the desktop stereo 116 to automatically request music from a playlist for the user account of the user of device 102, so that the desktop stereo 116 automatically begin playing the music. In such a mode of operation, the device 102 may be used as a remote control, such as to fast-forward, rewind, or skip through songs in the playlist. Also, the transactions between the client devices and the servers in this example may be through one or more networks including the Internet 120.

In certain implementations, subsequent transfers of a license (and the accompanying technical ability to listen to music in the cloud associated with the item shown here) may occur in a manner similar to the passing of the license from the retailer to the initial user of device 102. For example, if the user of device 102 sells the album to another user, that other user may scan his computing device pass the NFC chip 108, which may be taken as an attempt by the subsequent user to become the registered user of the item. Communications with the registration server 112 may occur in manners like those discussed above, but in this situation, the registration server 112 may recognize that the unique identifier for the package 104 has already been registered to the initial user. In such a situation, the registration server 112 may send a message to device 102 asking the user of device 102 whether authorization for obtaining the content should shift to the other user account. If the initial user and the subsequent user are next to each other as this occurs, the initial user may quickly receive a message and respond in the affirmative to the message. Upon the registration server 112 receiving such an affirmative response, the unique identifier for the item may no longer be associated in the same manner with the account of the user of device 102, and may instead become associated in that manner with the account of the subsequent user. Then, when the subsequent user asks to see his playlist, he will see the transferred album as part of the playlist. If the friend is simply borrowing the album for a short period, the process for transferring authorization may occur in the opposite direction, with the initial user scanning the chip 108, and the friend receiving a message asking the friend to confirm that authorization should returned back to the initial user.

This form of license passing may be referred to as involving a physical chain of custody, in that the package 104 or some other physical item that a user can manipulate with his or her hands must be in physical proximity to a computing device that is registered, in relation to the receiving user, with the system 100. The chain of custody is tied to the need for the physical presence of the item. Such an approach may also be useful to avoid theft of media. In particular, if a thief took the package 104 and attempted to obtain streaming access to the content by scanning his computing device across the chip 108, the rightful owner of the item may be notified automatically by the registration server 112, and may determine that his item has been stolen. The first user, instead of responding to the confirmation message in the affirmative to have authorization passed to the new user, may instead indicate that the new user is an illegitimate user. Such an indication, as explained in more detail below, may cause the rights to the particular license to be placed in limbo until the honest party can be identified. Such a self-reporting system and also be used to catch thieves readily, in that the system 100 may watch for multiple rejected registrations for a particular user, but from many different prior users. Such a pattern would suggest that the subsequent user obtained items from the many different users illegitimately, and his access and registration may be denied, while the registrations for the initial owners may be returned to those owners out of prior escrows.

The system described here may be particularly beneficial in balancing the desires of consumers of media and the concerns of those who produced the media. For example, a recording artist may take very seriously the order in which the songs on her album are placed and may also want all of her fans to receive an entire album, and not to simply purchase individual tracks from an album. Also, the recording artist may also be a visual artist and may want users to obtain modern forms of extras, including liners that may include lyrics for the songs that the recording artist is particularly proud of. The record companies may also obtain a benefit from being able to enforce license restrictions in a manner that is secure, but is relatively intuitive for, and not overbearing on, customers who buy the content. In particular, consumers of media are accustomed to handing physical copies of the media to each other, and the license transfer and access transfer mechanism described here simply adds to the traditional transfer process a step of quickly scanning a mobile computing device, such as a smart phone, across the physical copy of the media while handing it to the other person. The process then automatically sends messages to the relevant users that they can quickly respond to in order to have access to the content be transferred.

Figure 2:
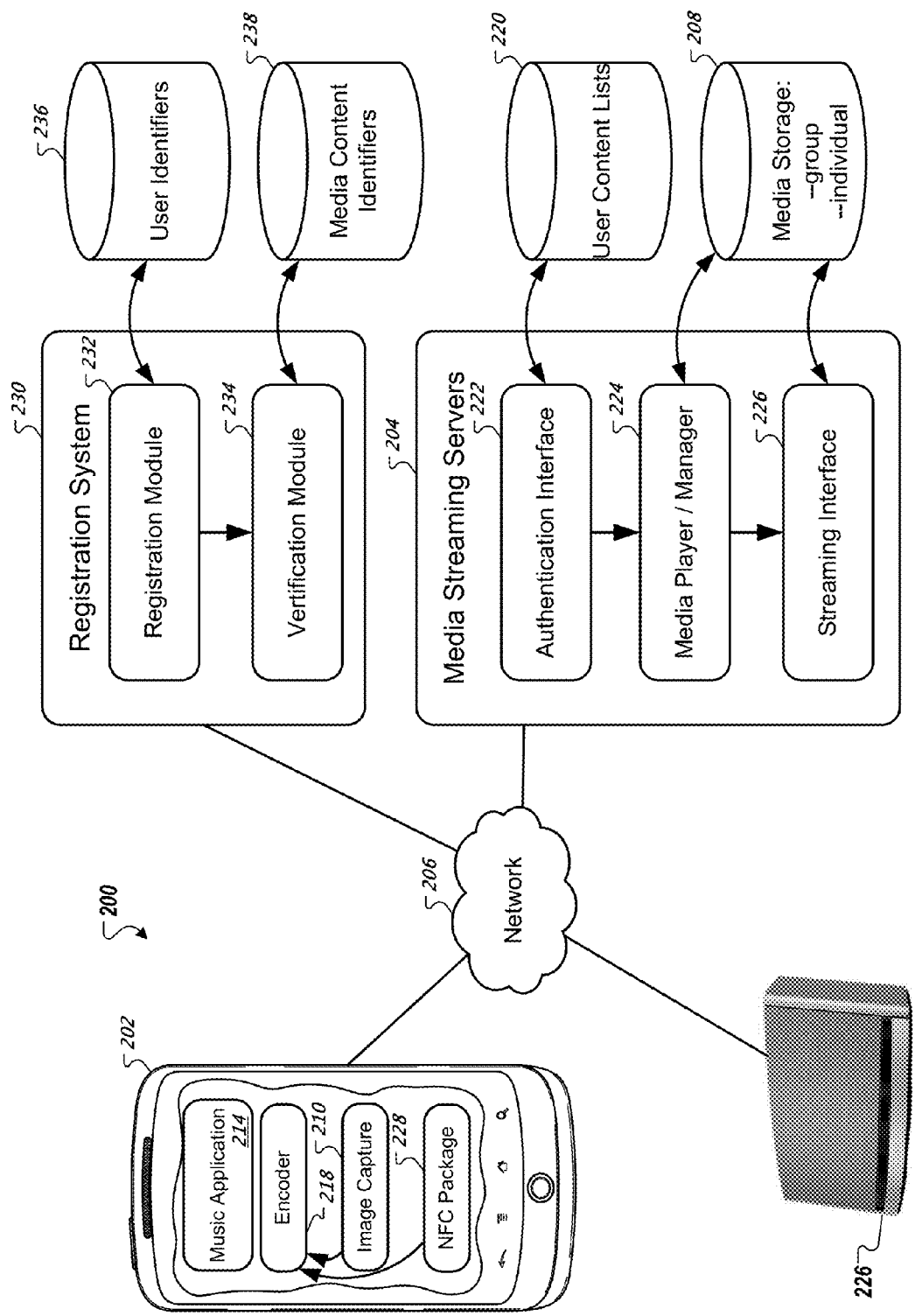
FIG. 2 is a block diagram of components of a system that makes on-line content available based on verification using a physical item.

FIG. 2 is a block diagram of components of a system 200 that makes on-line content available based on verification using a physical item. In general, the components enable a central server system to associate a particular user account with a particular physical item, and to make available, to devices that are logged into the account, content that corresponds to the item. The system 200 may, for example, correspond to particular components of the system 100 in FIG. 1.

The system 200 generally is made up of client-side devices and server-side systems that communicate through one or more networks 206 that include the internet. The devices include a smart phone 202 and an amplified music system 226. The smartphone 202 may be a standard computing device that is capable of executing built-in applications and applications that may be loaded onto the smartphone 202 by a user of the device. One such application is a music application 214 which may be part of a media player that is capable of receiving media files, such as files in a standard form for music, video, e-books, video games, and other similar forms of media, and of rendering them in a familiar manner, such as by playing a music file so that a user of the smart phone 202 can listen to the music through headphones connected to the smartphone 202. The music application 214 may be programmed to stream music from remote servers through the network 206 and may interact with a user to identify music that is available to the user, to add such music, and to otherwise manage the music. Other components on the smartphone 202 may assist a user is adding music to his or her account with a cloud-based service. Such components may, for example, permit a user to expose a piece of physical media, such as a CD or DVD jewel case, to the smartphone 202 so that the smart phone 202 may identify the piece of physical media to a cloud-based music service, and thereby obtain access to cloud-based copies of content that is on the piece of physical media, is represented by the piece of physical media, or that directly corresponds to the piece of physical media.

An NFC package 228 on the smart phone 200 to may be used to conveniently capture a unique identifier for various physical pieces of media. The NFC package 228 may take a standard form, may be accessed by various applications on the smartphone 202 (e.g., e commerce applications), and may obtain an identification number from a corresponding NFC chip or patch that has been applied to a piece of physical media and has been programmed with the number. In addition, an image capture module 210 may be used to obtain a visual digital image of the piece of physical media. The image capture module 210 may include, for example, a standard camera on the smart phone 202 that is programmed to route image information to the music application 214 in certain circumstances.

An encoder 218 may be used to encode various information for submission to a cloud-based music service. The information may include, for example, an identifier for a piece of physical media obtained by the NFC package 228, an identifier of the user of the smartphone 202, such as a user account number for the user that may be stored and available on the smart phone 202 when the user is logged into a cloud based music service, and other information, such as a number corresponding to a bar code that may have been captured by image capture module 210, and converted to an alphanumeric representation by submitting an image of the barcode to a barcode conversion service over the network 206. The encoder 218 may be part of the music application 214, and may be provided with a public key that corresponds to a cloud-based music service, so that the encoder 218 may encode the information discussed here using such a key. The encoder 218 may then provide the included information to the music application 214 for submission to the cloud-based music service. Also, the identifier may simply be send over a secure link using, e.g., SSL, HTTPS, or a similar mechanism.

Though the cloud-based music service may take many forms, for convenience and clarity, it is shown here as involving two separate server subsystems. First, a registration system 230 may communicate with the smartphone 202 in order to register certain pieces of content as being available to the user of smartphone 202. For example, when a user is executing the music application 214, she may select a control, such as an on-screen icon, in the music application 214 in order to have the smartphone 202 gather identifying information for a physical item such as a jewel case. The components discussed above may cause the identifying information to be transmitted form the smartphone 202 to a registration module 232 of the registration system 230. The registration module 232 may use a private key to decode the message and to extract identifiers for the user and for the physical item.

The registration module 232 may then compare identifiers for the user of device 022 to a set of stored user identifiers 236 in order to determine whether the user has an account with the system 200. If the user does have an account, the registration module 232 may pass the identifiers for the physical item to a verification module 234. The verification module 234 may check a set of media content identifiers 238 to determine whether the identifier submitted by smartphone 202 has previously been registered with the system 200. If the system 200 does not have a record for the physical item, a user account for that user may be associated with the physical item by the registration system 230. Such an action may have the effect of making the user account to which smartphone 202 was logged in, a verified licensee for cloud-based service of content that corresponds to the physical item.

A media streaming servers system 204 may be used to deliver such cloud-based content to users of various devices including smart phone 202. The system 204 may operate by receiving requests from such client devices through an authentication interface 222 that refers to a user content lists database 220 in order to determine whether a user has access to a particular item, or to identify all items of content to which the user has access. The user content lists 220 may be formed and managed in various ways. For example, when the registration system 230 registers that a particular user account has been associated with a particular piece of physical media, it may inform the system 204, which may add to a content list for the user in database 220, an identifier that corresponds to that physical media.

For example, if a user submits an identifier for a particular property of the AC/DC album Back in Black, the system 200 may correlate that album to an internal identification number that AC/DC's record label has linked to the album. That internal identification number may in turn be used to provide the user with streaming access to the corresponding copies of each of the songs on the Back in Black album. The streaming copies may be bitwise identical to the songs on the album, or may differ slightly, such as by being sampled at a lower bit rate than the songs on the CD. The streaming copies may also differ more substantially, such as by remastered versions of the CD songs that are sonically superior to the versions that were recorded on the CD an earlier time. In such a manner, a user may receive updated versions of the songs through the streaming service, which is an additional benefit that the user could not obtain by simply having access to the CD. The songs may differ in other ways also, such as by providing a user with access to multiple versions of certain songs on the CD, such as live recordings at concerts, special extended play versions, and studio sets. Moreover, the user may be provided access to music videos, special digital images, extended liner notes, interviews with the band, and other similar information. As a result, the system 200 may give the user an augmented experience compared to what the user could obtain from simply buying the piece of physical media, and the experience may be updated after the user buys the piece of physical media.

Such users may be thus be given a form of backstage pass or club membership that corresponds to their possession of the particular piece of physical media area and a media player/manager 224 may interact with the music application 214 to show a user of the smartphone 202 what media content is available. The media player/manager 224 may obtain information from the authentication system 230 regarding what pieces of media are in a particular user's library. When a user chooses to play a piece of media, the media player/manager 224 may send a command to a streaming interface 226 to have a copy of the media accessed from media storage 208, and streamed through the network 206 to the smartphone 202.

The media storage 208 may store multiple types of media, depending on the licensing scheme in effect for a user's use of the media. For example, where a user has been uniquely connected to a particular physical item, a record label may be willing to allow the multiple users to obtain streaming from a single copy of content that relates to the item. Such an approach may be beneficial in that the system 200 will not have to store a separate copy of the same content for each and every user of the system 200. Alternatively, users may be allowed to have certain media in their collection for which they have not provided a unique identifier from a physical item. For example, a user may be allowed to upload MP3 files from the smart phone 202 to the system 200, and for licensing reasons, the system 200 may store a unique copy in a locker that is reserved for the user for such content. Such media locker streaming systems are well-known, and the particular arrangement of such storage is not critical to the implementation of the other forms of media streaming and management discussed here. Thus, a single user may have in her account physically verified copies of some songs and copies of songs that have not been verified, and may access both copies in similar manners, though additional services may be made available for the physically verified copies (e.g., extras, live recordings, etc.).

While the streaming interface 226 may be provided with an identifier for an account of smart phone 202 so as to stream music readily back to smartphone 202, the streaming interface 226 may also be caused to route streaming music to a different location. For example, the amplified music system 226 may itself be provided with an NFC label or NFC chip (for 2-way communication), and an interface for communicating over the network 206 so as to obtain streaming media content. If a user of the smart phone 202 passes the smartphone 202 near the amplified music system 226, an identifier for the amplified music system 226 may be obtained by the smart phone 202, and music application 214 may forward that identifier to the streaming interface 226. The streaming interface 226 may then interpret such submitted information is an intent by the user of smart phone 202 to have her content streamed, for a current session, to the amplified music system 226, and may cause such streaming to occur. Such an implementation may have the benefit of allowing a user of device 202 to listen to music from her streaming library through various devices other than her smartphone 202 or headphones attached to her smartphone 202.

For example, she may have been listening to music through headphones during a jog, and upon returning home may remove the headphones and swipe the smartphone 202 past the amplified music system 226, so as to have the same playlist that she was listening to during the jog continue to play in her house while she tends to other tasks. Such a transition may be simple and automatic, simply by requiring the user to bring a smart phone 202 in close proximity to the amplified music system 226 while the music application 214 is playing. Such an action may then cause the music application 214 to communicate its intent to the streaming interface 226, which may then automatically change the destination address of the music that is claimed to the amplified music system 226.

In another example use case, the user of smart phone 202 may attend a party at a friend's house, and the friend may have relatively bad taste in music, at least in the opinions of most of the guests for the party. If the user of device 202 is deemed by the group to have good taste in music, the user of the device 202 may bring the smart phone 202 in close proximity to an amplified music system 226 owned by a host of the party, and the playlist of the user may begin playing through the amplified music system 226. During such operation, the smart phone 202 may continue to be a controller for the playing of the music, and it may communicate with the media player/manager 224 in familiar ways, such as to skip songs, to change the order of a playlist, to change playlists from a playlist that are available to the user of the smartphone 202 in other familiar manners—while the changes are reflected via music that is played through amplified music system 226.

Figure 3A:
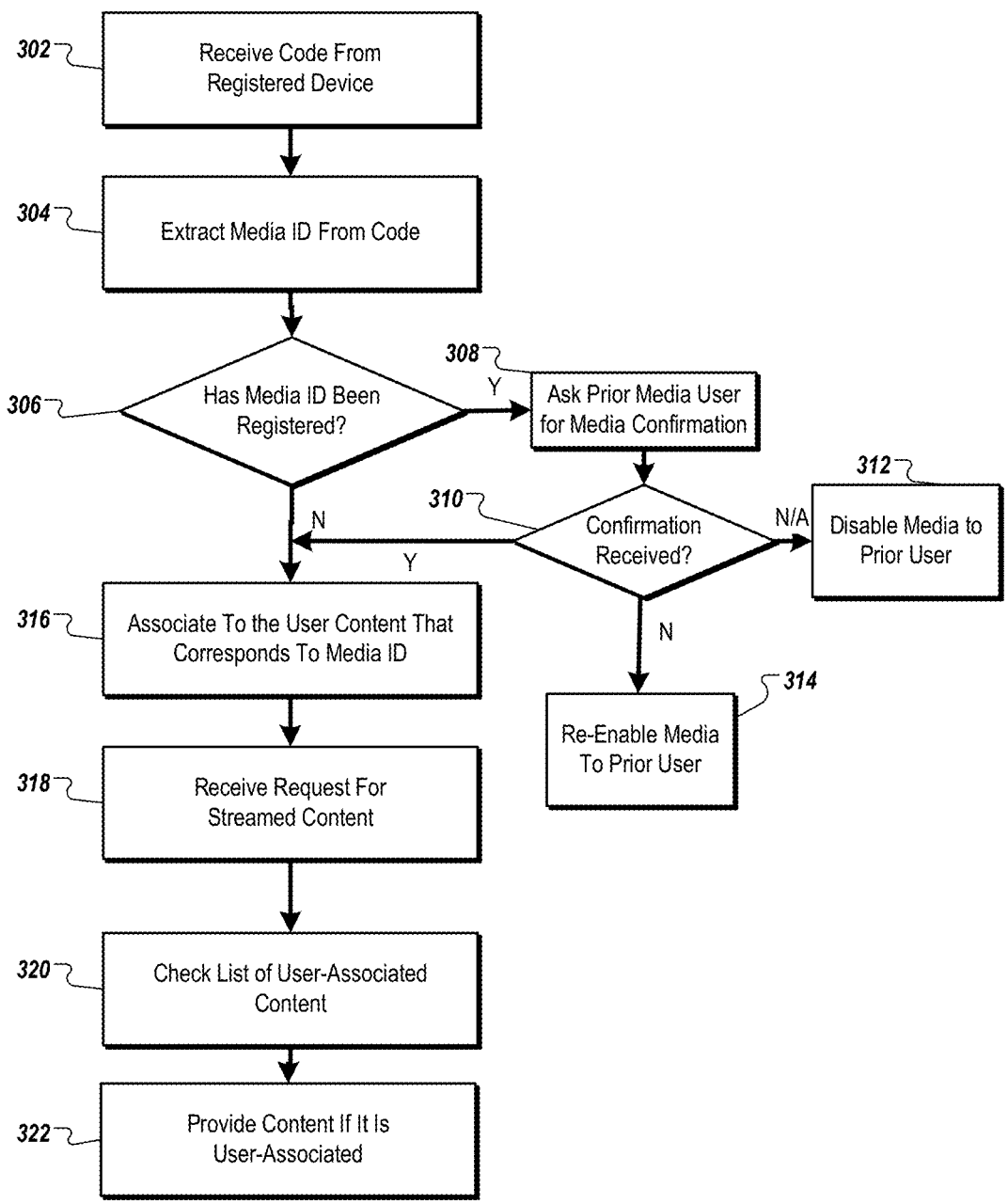
FIG. 3A is a flow diagram of server-side actions for making streamed content available to remote computing devices.

FIG. 3A is a flow diagram of server-side actions for making streamed content available to remote computing devices. In general, the process presented by the flowchart may be performed by systems such as system 100 in FIG. 1 above and system 200 in FIG. 2 above, in order to associate a user account at a hosted music system with a particular physical media items, and to make available, to the user of the user account, media content that corresponds to those physical items.

The process begins at box 302, where the system receives a code from a registered device. The device may be a mobile computing device such as a smartphone that has been registered by a user of the device previously logging into an account with the system. A user ID may be stored in a cookie on the device or in another mechanism, so that it may be submitted by a media application on the device to the system so that such submissions may be correlated to the user account.

At box 304, the system extracts a media ID from the code that was submitted. The code may be formatted in various different manners, and may be part of a URL submitted in an HTTP, HTTPS, or SPDY request from a browser-based media player operating on the remote computing device. The code may be parsed from the URL, and may then be decoded by applying a cryptographic key that owned by a provider of the system. The decoded code may include multiple pieces of information, including the user ID and the media ID. The media ID may be a number (e.g., alpha-numeric) that was previously selected by a provider of a piece of physical media to uniquely identify that piece of physical media. The purpose of the unique identifier is to permit tracking of the possession of the physical media to a particular party, and to prevent multiple parties from simultaneously claiming that they possess the piece of physical media.

At box 306, the system determines whether the media ID has previously been registered by this user or by another user. If the media ID exists in a database of the system so as to indicate that it has previously been registered, the system obtains a user ID of the user who previously registered the piece of physical media and sends a message to a device that corresponds to that user, such as by sending a text or e-mail message to the user. The message may ask that first user to confirm whether they currently possess the media item so as to determine whether it has been legitimately passed to the user who is currently trying to register the item, or has instead been stolen or otherwise improperly obtained by the subsequent user.

The first user may respond in at least three manners. First, the may not respond at all, and the ability to stream media that is associated with the physical item may be disabled for all users in such a situation. In that situation, the system is unable to determine whether the subsequent user obtained the media item legitimately or illegitimately, and thus cannot determine whether either of the users should have access. Second, the first user may deny access to the subsequent user and may reconfirm his own access by exposing the piece of physical media to his computing device and can affect reregistering it with the system. Thus, at box 314, the system may then re-enable media streaming to the first, or prior, user who has reestablished physical possession of the physical item. Such a situation may occur, for example, if the first user held a party and a less-than-honest guest at the party tried to scan the first user's jewel cases so as to obtain access to the first user's library of music. The system in such a situation would alert the first user to the fact that someone has tried to do that, and may enable the first user to reestablish his rights to streaming versions of the content.

In a third scenario, the first user may confirm the transfer to the subsequent user. For example, the first user may sell a CD to a friend, and while the transaction is occurring, the friend may scan her device across the CD, and the system may immediately send a message to the first user asking the first user to confirm the transfer of the physical item to the second user. The first user may make such a confirmation, and the system may then send a message to the friend indicating that the friend now has access to the media. As a result, the process described here may provide an easy way for users to transfer online media rights in parallel with the transfer of physical media. Such a process enables a simple chain of custody transfer method in which the physical access to media and the cloud-based access to media pass in parallel, in a manner that can easily be understood by most users of the content, and that does not interfere substantially with the users' enjoyment of the content.

At box 316, the process then associates to the user of the device that was exposed to the media item, online content that corresponds to the media ID. For example, as explained above, a particular physical album may be associated in a streaming media service with digital copies of songs on the album, in addition to variations of those songs, and additional content that may be made available to people who purchased the physical copy.

At box 318, the system receives a request for streamed content. For example, the friend who bought an album above may, at a later time, open a media player on the device is to see all the media items in her library. The songs associated with the particular item may then be shown to the user, by the system checking, at box 320, a list of user-associated content for that user, which will now include the content associated with the transferred item. Finally, at box 322, the content is provided to the user if it is determined to be user-associated by the system. The provision of the content may occur in various ways, such as by showing an icon or list of songs to the user for their selection, and then subsequently streaming the music of those songs if the user indicates that they would like to listen to the songs.

Figure 3B:
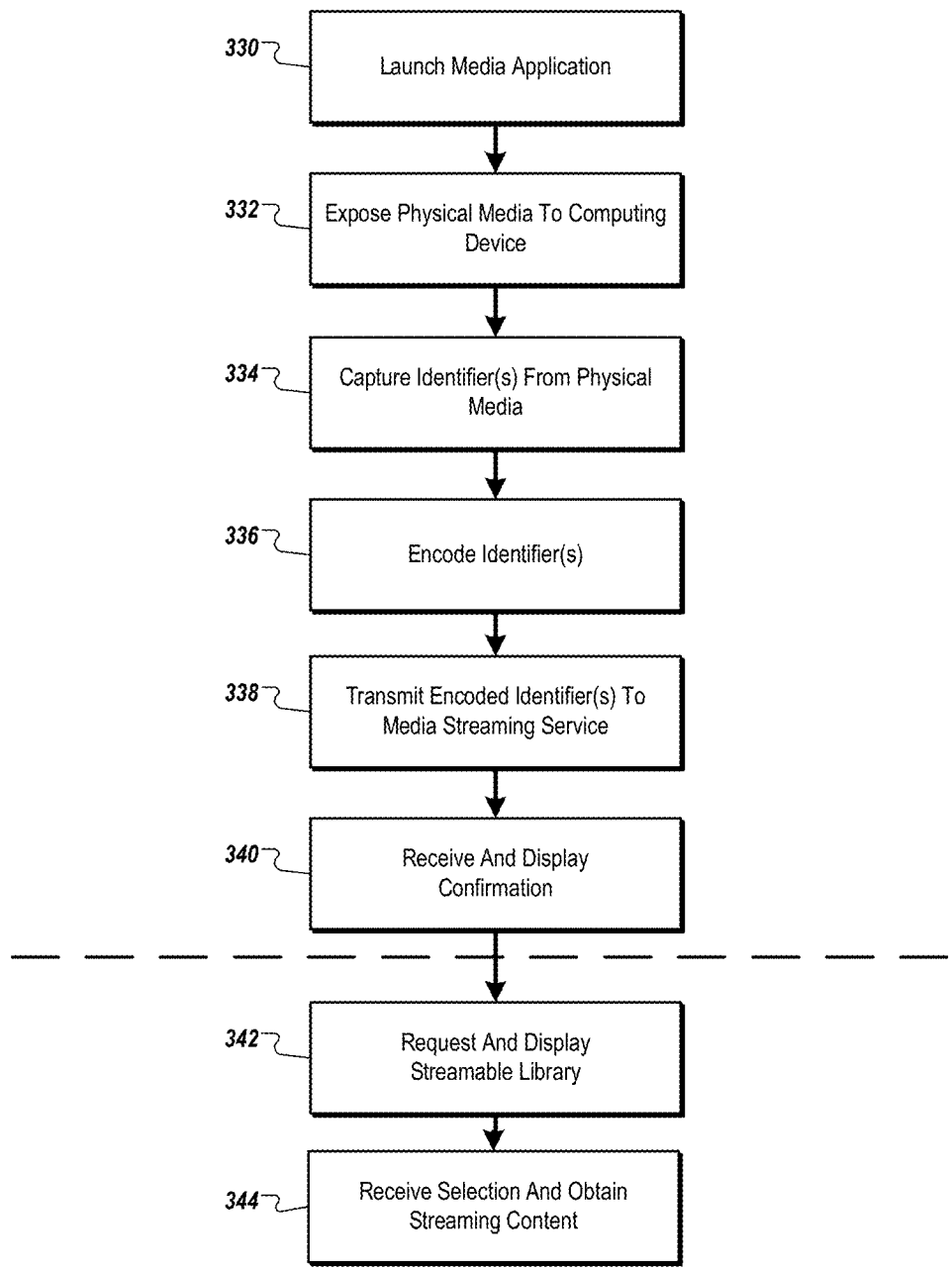
FIG. 3B is a flow diagram of client-side actions for making streamed content available from remote server systems.

FIG. 3B is a flow diagram of client-side actions for making streamed content available from remote server systems. In general, the method discusses actions that may occur at a client device such as smartphone device 102 in FIG. 1 or smart phone 202 in FIG. 2 above. The client device may take a variety of forms, and generally is a device having basic computing power necessary to decode streaming media over a network and play it for one or more users of the device, in addition to having the ability (optionally) to let the user to control the playing of such music or other media.

The process begins at box 330, where a user of the device launches a media application on the device. Such launching may occur automatically by the user holding the device in an appropriate manner, or by the user selecting an on-screen icon that represents the media application. The media application may be presented to the user as a standard media player, by which a user may review media content that is in their library, select certain examples of the content to be played, and then listen to or watch such content. The media application may support, for example, content in the form of music, video, electronic books, and video games, among other things. The media application may also execute in the background on the device while the user is reviewing another applications on the device.

At box 332, the user exposes a piece of physical media to the computing device. Such exposure may involve bringing the device in close proximity to the piece of physical media so that an NFC badge on the media can be read by the device, and the device may obtain a unique identifying number for the piece of physical media. The unique identifying number may be used to determine that the user has current possession of that particular piece of physical media, and to distinguish situations in which two different users try to claim possession of the same piece of physical media at different points in time.

The physical media may take a variety of forms. For example the media may include a CD or DVD, along with a jewel case or other packaging for the CD or DVD. An NFC label may be applied to the disk itself, or to the packaging, such as on the outer surface of a jewel case. The media may also be simply a booklet, such as a booklet that would be traditionally packaged inside a CD jewel case, and that can include liner notes, lyrics, photos of a band or artist, and other traditional information that artists would like to have available to their fans. Thus, a retail store may execute a transaction to sell the booklet to a user in a standard price such as $10, where the substantial value of the transaction is in the ability to scan the booklet and obtain on-line access to the content that is associated with the booklet.

At box 334, the client device captures identifiers from the physical media. For example, an NFC transaction may allow the device to capture a unique identification number that has been programmed into an NFC label on the piece of physical media. Also, a camera on the device may capture an image of a bar code on the piece of physical media which may be further used to help identify the piece of physical media. For example, the NFC identifier may be unique only within a particular album of record label, and the combination of the bar code identification to determine what album the user has, with the identifier that is unique within that set of albums may be used to uniquely identify the piece of media. Also, in various applications, an actual image of the outside of the media may be used to help identify the media. For example, the image may be uploaded to a server system, and visual recognition techniques may be applied to help determine and identify the piece of physical media that the user possesses.

At box 336, the identifiers are encoded such as in the manners discussed above, and may be transmitted either alone or with additional information, to a media streaming service that is remote from the device, at box 338. If the streaming service determines that the piece of media has not been registered with someone else (e.g., in the manners described above), the device may soon after receive a confirmation that the user can access on-line versions of the content, and may display such confirmation to the user, such as through an alert or other notification.

A dotted line is shown through the figure to indicate that the final two example actions may, and typically will, occur long after the earlier actions. For example, at box 342, a user causes the device to request and display the user's streamable library of content that is associated with the user's on-line account. Such information may be displayed and manipulated in manners that are familiar from traditional media players. Finally, at box 344, the device receives a user selection and obtains a particular one or more examples of the streaming media content. For example, a user may select a playlist that includes songs that were on the physical media that the user previously exposed to their device (even if that physical media is no longer anywhere near them), and those songs may play automatically in succession from streaming data.

Figure 4:
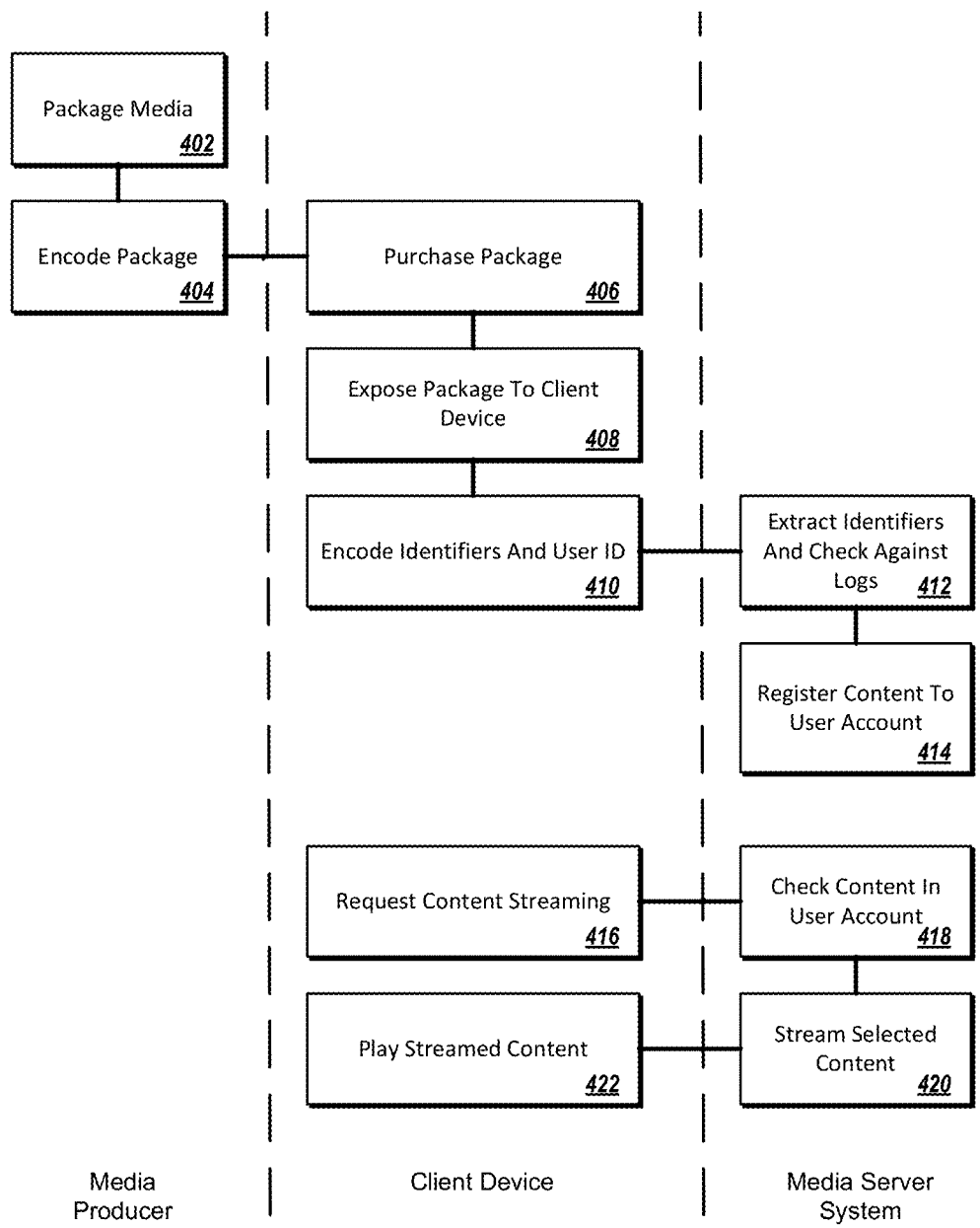
FIG. 4 is a swim lane diagram showing example actions by various components in a content distribution system.

FIG. 4 is a swim lane diagram showing example actions by various components in a content distribution system. The process shown here is similar to those discussed above, and is shown as an example here to indicate particular actions that may be performed by various components in a larger content distribution system, including a media producer (e.g., a record label), a client device, and a media server system.

The example process begins at box 402, where a media producer packages media for physical distribution. The media producer may be a record label or other rights holder in the media, or an entity working under contract with the rights holder, such as a record club that distributes CDs to members, or other entities that press/record and package physical media on behalf of publishers and other producers.

At box 404, the packages for each item of the media are encoded. For example, as CDs are packaged on an assembly line, they may be exposed to an NFC programmer, which may index a ID number upward for each CD that passes it, and may thus program unique ID numbers into each such NFC device.

The process moves to the consumer at box 406, where a user of a client device (e.g., a media player or smartphone) may purchase one of the CD's, and may then, at box 408, expose it physically to her device, such as by sweeping her device past it in close proximity so as to transfer data from the NFC chip to the device. The device may then encode the media identification information, along with information such as a user ID for the user of the client device, and may pass the information to a media server system.

At box 412, the media server system extracts the media identifier(s) and checks them against logs that keep track of media identifiers that have been submitted to the system (or to another system that shares such information with the first system). If the identifiers are new, the system registers on-line content that corresponds with the purchased CD to be associated with the user's account, so that the user can obtain access to the on-line content. (box 414).

Later, the user may request, at the client device, and from the media server system, content streaming, including streaming of content associated with the CD. The media server system may check its records to identify what on-line content the user can access, begins streaming the content at box 420, and the user can hear and/or see the content on the client device at box 422.

FIGS. 5A-5F are images of sequential action between physical pieces of media and an electronic music system. The media in this case include three different CD jewel cases that each may or may not have CD's currently in them, but that are provided with NFC capability, such as by having an NFC tag attached inside each package. The music system in this example is represented by an orb that includes NFC sensing and reading functionality. The orb is attached by wire to communicate with a computer system programmed to play pre-recorded digital music under appropriate circumstances. In a commercial implementation, the computer system could be a large-scale server system that stores previously-acquired copies of a large variety of songs, and is able to stream the music to various users under licenses with the rights holders where that is necessary.

Figure 5A:
FIGS. 5A-5F are images of sequential action between physical pieces of media and an electronic music system.

In FIG. 5A, we can assume that a user has not yet used the system, and thus has not been authorized to use any hosted music that is otherwise available for streaming form the system. In the figure, the user is reaching to pick up the jewel case for Wish You Were Here from progressive rock group Pink Floyd—an album that explores themes of absence because of the then-recent mental decline of former band-mate Syd Barrett. The user has selected the case as a first step in gaining access to a cloud-based version of the CD that might be available.

Figure 5B:

In FIG. 5B, the user has moved the case over the orb and in close proximity to, if not direct contact with, the outer surface of the orb. Such action may cause the music system to obtain an identifying number (which may be alphanumeric) that at least identifies that it is a copy of Wish You Were Here, and might also uniquely identify the particular copy that is shown here. Upon the system identifying the CD, the system may sound a tone so that the user may know that the music is ready for streaming from the cloud. The actions here did not transfer content form the CD to the system, and the actions could have been taken even if the CD was not in the jewel case (though the NFC tag could be placed on the CD itself to require that the CD by nearby for registration to occur). At this point, no music plays from the music system. However, if the user removed the Pink Floyd CD form the orb and then moves it back into proximity of the orb, the music from the CD may begin to stream form the system. Such playing may begin automatically simply by the user bringing the jewel case in proximity of a device like the orb. The music may start from the beginning, or the music system may keep a pointer to identify where the user last was when listening to cloud-based streaming of the music (though here, the user would probably start at the beginning because the user presumably has never listened to the streaming version of the music before—at least not when registered under her own account with the music system).

Figure 5C:

At FIG. 5C, the user has put down the Pink Floyd jewel case, and picked up a jewel case for Duran Duran's double platinum Rio CD. Again, the user has brought the jewel case into close proximity of the orb, and the system may play a tone to indicate to the user that the disc is registered. The identifier passed to the system in this instance may vary from one version of the album to the next, and particularly may indicate whether the CD is from the original UK master tapes, or instead is a remastered version that includes the Kershenbaum remixes. In this instance, the user simply sets the jewel case down without bringing it to the orb a second time, and as a result, no Duran Duran begins to play. The Pink Floyd may stop playing when the tone is played to indicate the registration of the Duran Duran disk, or the Pink Floyd may stop playing.

Figure 5D:
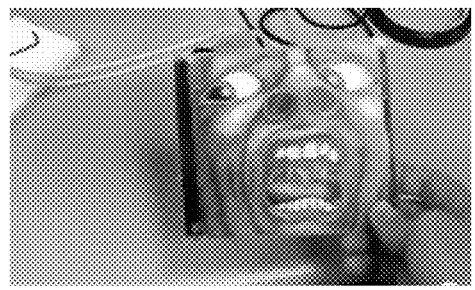
Figure 5E:
Figure 5F:
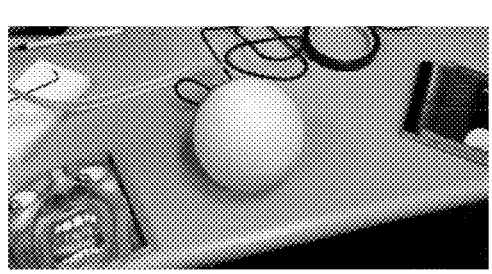

At FIG. 5D, King Crimson's semi-eponymous In the Court of the Crimson King, named by the band's guitarist as "New York's acid album of 1970," is next exposed to the orb's NFC sensors. Again, the jewel case is only brought into proximity once, so that the system stays quiet from the time Rio was scanned, or continues playing Pink Floyd (by this point, perhaps Welcome to the Machine or even Have a Cigar, if the user is deliberate enough). In FIG. 5E, the Rio jewel case is brought again to the orb, so that the music shifts now to Duran Duran. In FIG. 5F, apparently the user enjoys Duran Duran, because he has put down all the jewels cases, and the Duran Duran will keep playing until the song or album ends (or it may repeat, if the user's account settings are set that way) or until the user exposes another piece of physical media to the orb.

In commercial implementations, the orb may be replaced, for example, by a smartphone, a portable music player having networking capabilities, a countertop internet radio, and other such devices and systems, including those discussed above.

Figure 6:
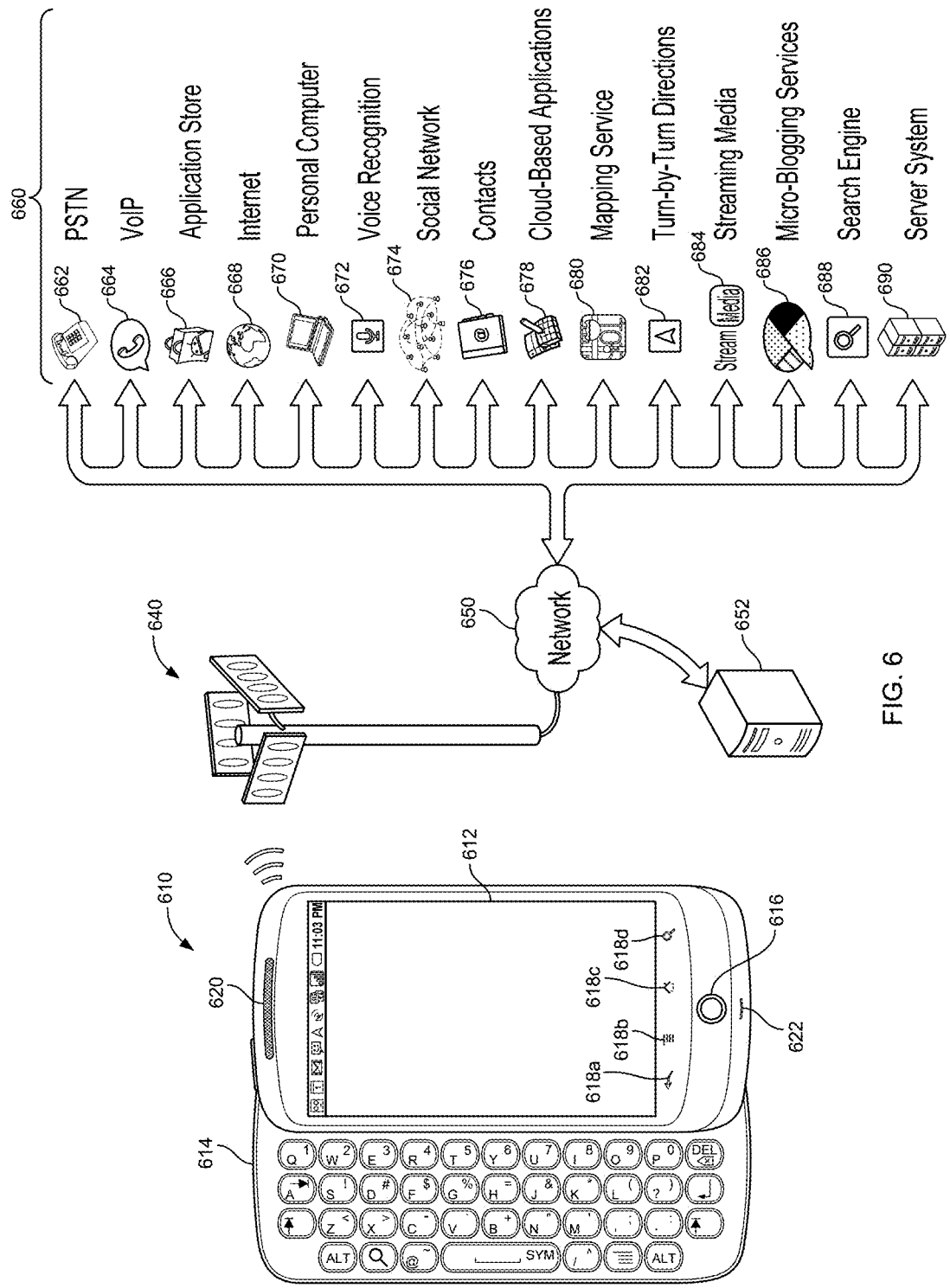
FIG. 6 is a conceptual diagram of a system that may be used to implement the systems and methods described in this document.

Referring now to FIG. 6, a conceptual diagram of a system that may be used to implement the systems and methods described in this document is illustrated. Mobile computing device 610 can wirelessly communicate with base station 640, which can provide the mobile computing device wireless access to numerous services 660 through a network 650.

In this illustration, the mobile computing device 610 is depicted as a handheld mobile telephone (e.g., a smartphone or an application telephone) that includes a touchscreen display device 612 for presenting content to a user of the mobile computing device 610. The mobile computing device 610 includes various input devices (e.g., keyboard 614 and touchscreen display device 612) for receiving user-input that influences the operation of the mobile computing device 610. In further implementations, the mobile computing device 610 may be a laptop computer, a tablet computer, a personal digital assistant, an embedded system (e.g., a car navigation system), a desktop computer, or a computerized workstation.

The mobile computing device 610 may include various visual, auditory, and tactile user-output mechanisms. An example visual output mechanism is display device 612, which can visually display video, graphics, images, and text that combine to provide a visible user interface. For example, the display device 612 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 612). Further, the mobile computing device 610 may include one or more speakers 620 that convert an electrical signal into sound, for example, music, an audible alert, or voice of an individual in a telephone call.

An example mechanism for receiving user-input includes keyboard 614, which may be a full qwerty keyboard or a traditional keypad that includes keys for the digits '0-9', '*', and '#.' The keyboard 614 receives input when a user physically contacts or depresses a keyboard key. User manipulation of a trackball 616 or interaction with a trackpad enables the user to supply directional and rate of rotation information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618a-d. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 614. User-selection of the button may invoke the pre-defined action.

In some examples, the operating system provides a "desktop" user interface that is displayed upon turning on the mobile computing device 610, activating the mobile computing device 610 from a sleep state, upon "unlocking" the mobile computing device 610, or upon receiving user-selection of the "home" button 618c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 610 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 612 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 610 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 610 may include other application modules and hardware. A call handling unit may receive an indication of an incoming telephone call and provide a user capabilities to answer the incoming telephone call. A media player may allow a user to listen to music or play movies that are stored in local memory of the mobile computing device 610. The mobile telephone 610 may include a digital camera sensor, and corresponding image and video capture and editing software. An internet browser may enable the user to view content from a web page by typing in an addresses corresponding to the web page or selecting a link to the web page.

The mobile computing device 610 may include an antenna to wirelessly communicate information with the base station 640. The base station 640 may be one of many base stations in a collection of base stations (e.g., a mobile telephone cellular network) that enables the mobile computing device 610 to maintain communication with a network 650 as the mobile computing device is geographically moved. The computing device 610 may alternatively or additionally communicate with the network 650 through a Wi-Fi router or a wired connection (e.g., Ethernet, USB, or FIREWIRE). The computing device 610 may also wirelessly communicate with other computing devices using BLUETOOTH protocols, or may employ an ad-hoc wireless network.

A service provider that operates the network of base stations may connect the mobile computing device 610 to the network 650 to enable communication between the mobile computing device 610 and other computerized devices that provide services 660. Although the services 660 may be provided over different networks (e.g., the service provider's internal network, the Public Switched Telephone Network, and the Internet), network 650 is illustrated as a single network. The service provider may operate a server system 652 that routes information packets and voice data between the mobile computing device 610 and computing devices associated with the services 660.

The network 650 may connect the mobile computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the mobile computing device 610. Conversely, the mobile computing device 610 may send a communication to the service provider server system 652 initiating a telephone call with a telephone number that is associated with a device accessible through the PSTN 662.

The network 650 may connect the mobile computing device 610 with a Voice over Internet Protocol (VoIP) service 664 that routes voice communications over an IP network, as opposed to the PSTN. For example, a user of the mobile computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 666 may provide a user of the mobile computing device 610 the ability to browse a list of remotely stored application programs that the user may download over the network 650 and install on the mobile computing device 610. The application store 666 may serve as a repository of applications developed by third-party application developers. An application program that is installed on the mobile computing device 610 may be able to communicate over the network 650 with server systems that are designated for the application program. For example, a VoIP application program may be downloaded from the Application Store 666, enabling the user to communicate with the VoIP service 664.

The mobile computing device 610 may access content on the internet 668 through network 650. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

A voice recognition service 672 may receive voice communication data recorded with the mobile computing device's microphone 622, and translate the voice communication into corresponding textual data. In some examples, the translated text is provided to a search engine as a web query, and responsive search engine search results are transmitted to the mobile computing device 610.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members. For example, advertisement and news article content may be selected for the user based on a level of interaction with such content by members that are "close" to the user (e.g., members that are "friends" or "friends of friends").

The mobile computing device 610 may access a personal set of contacts 676 through network 650. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program. Example cloud-based application programs include GOOGLE DOCS word processor and spreadsheet service, GOOGLE GMAIL webmail service, and PICASA picture manager.

Mapping service 680 can provide the mobile computing device 610 with street maps, route planning information, and satellite images. An example mapping service is GOOGLE MAPS. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program. Example services that provide streaming media include YOUTUBE and PANDORA.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 7:
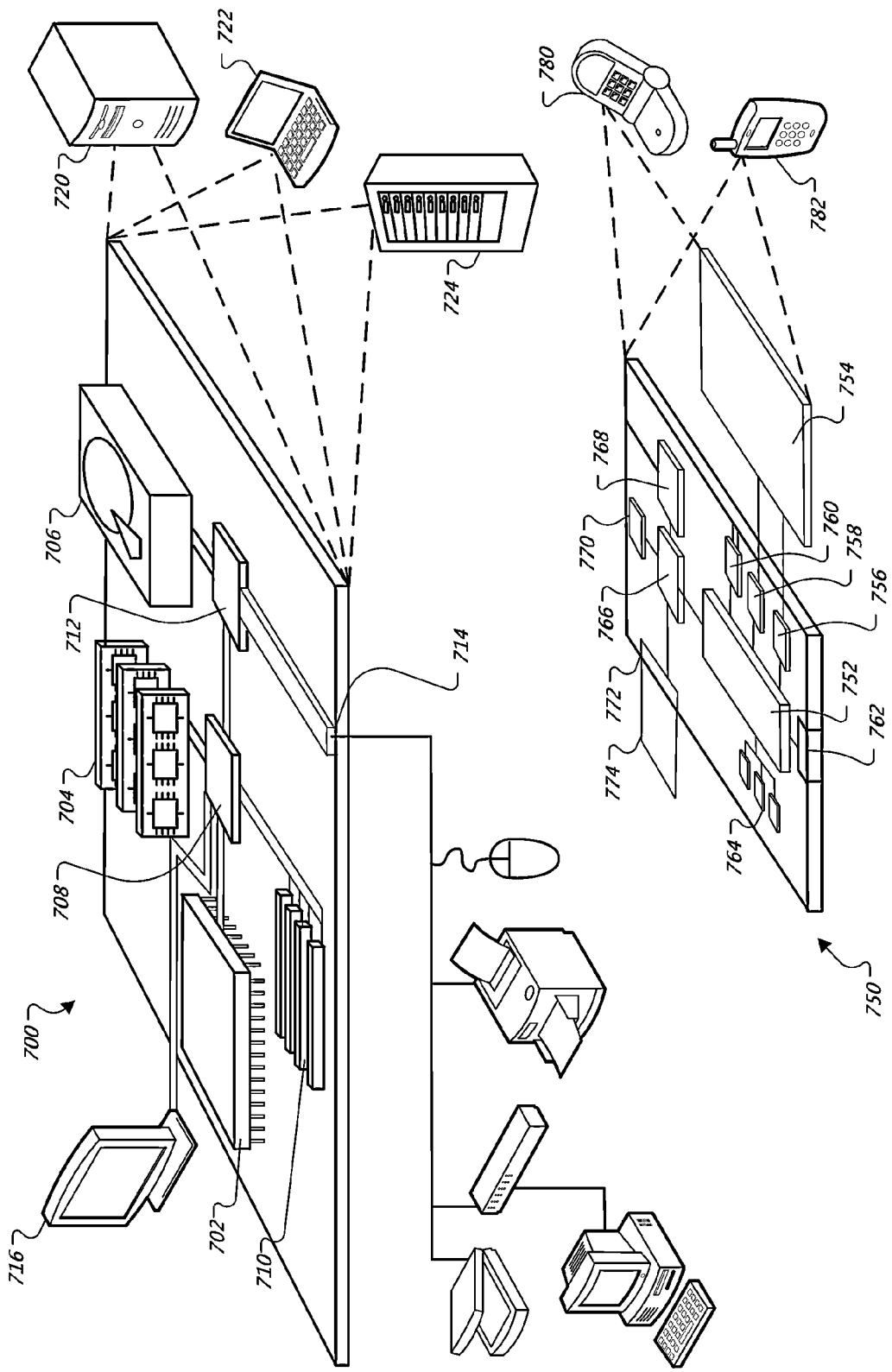
FIG. 7 shows an example of a computer device and a mobile computer device that can be used to implement the techniques described herein.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 610 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 752.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for electronic content management, the method comprising:
   receiving, from a remote communication device and at a server system, information that indicates a unique identifier for a physical item that corresponds to media content, the identifier differing from identifiers for other physical items that correspond to the same content;
   associating the received information with an account of a first user of a hosted internet service;
   providing, as a result of associating the received information with the account of the first user and by the hosted internet service to remote communication device for streaming play on the remote communication device, content that matches the content that corresponds to the physical item, based on a determination that the received information authorizes the first user to obtain the content provided by the hosted internet service; and
   passing streaming of an ongoing stream of the content from the remote communication device to a second device in response to the physical item or the remote communication device being exposed in proximity to the second device.

2. The method of claim 1, further comprising determining whether the unique identifier has been provided by another user of the hosted internet service.

3. The method of claim 2, further comprising identifying that the received information authorizes the first user to obtain the content provided by the hosted internet service if the unique identifier has not been provided by another user.

4. The method of claim 2, further comprising, if the unique identifier has been provided by another user, requesting that the other user again provide the information that indicates the unique identifier for the physical item to establish that the other user still possesses the physical item.

5. The method of claim 1, wherein the information that indicates a unique identifier for the physical item comprises a combination of multiple different information sources on the physical item.

6. The method of claim 1, wherein providing the content for streaming play on the remote communication device occurs immediately upon associating the received information with the account of the first user.

7. The method of claim 1, further comprising verifying that a seller of the physical item has confirmed that it sold the physical item, as a condition to providing the content to the remote communication device.

8. The method of claim 1, further comprising providing access, by the remote communication device, to content that is in addition to content that is recorded on the physical item but corresponds to the content that is on the physical item.

9. The method of claim 1, further comprising associating the physical item with multiple different users over time, and providing the content to the multiple different users over time, while enforcing access limitations so that only one of the multiple different users has an ability to access the content at a particular time.

10. The method of claim 1, wherein the remote communication device is able to forward the streaming play of the content from the remote communication device to a separate content playing device that is capable of presenting the content to one or more users.

11. A computer-implemented method for electronic content management, the method comprising:
- exposing a piece of physical media that contains electronic content to an network- connected electronic computing device;
- transmitting, from the electronic computing device to a server system for a hosted internet service, information that uniquely identifies the piece of physical media from other pieces of physical media that contain the same or similar content;
- subsequently requesting, by the electronic computing device and from the hosted internet service, served content that matches the content on the physical media;
- receiving the served content based on a determination by the hosted internet service that the information that uniquely identifies the piece of physical media has not been provided by other user of the hosted internet service;
- playing, with the electronic computing device and to a user of the electronic computing device, the served content; and
- passing playback of the served content from the electronic computing device to a second device in response to the electronic computing device being exposed in proximity to the second device.

12. The method of claim 11, further comprising receiving a request from the hosted internet service to expose the piece of physical media to the electronic device again to confirm the user's possession of the piece of physical media.

13. The method of claim 11, further comprising generating an identifier for the piece of physical media using a combination of multiple distinct and different information sources on the item.

14. A computer-implemented system for electronic content management, the system comprising:
- a web interface arranged to receive, from remote computing devices, information that uniquely identifies pieces of physical media proximate to the remote computing devices;
- a data store associated with a content providing service, the data store correlating information that identifies particular pieces of media with particular user accounts; and
- a media server that is part of the content providing service and is programmed to provide content in response to user requests, based on determinations that requesting users have previously provided information that uniquely identifies pieces of media for the requested content, and that other users have not, including by providing content for streaming play on the same remote computing devices that provided the information that uniquely identifies the pieces of physical media,
- wherein one or more of the remote computing devices are configured to pass playback of provided content to a second device in response to the one or more of the remote computing devices being exposed in proximity to the second device.

15. The system of claim 14, wherein the media server is programmed to compare identifying information obtained with electronic devices by the users and from physical items, with identifying information stored in the data store.

16. The system of claim 14, wherein the media server is programmed to request, if information that uniquely identifies a piece of media has been provided by another user, that the other user again provide the information that indicates the unique identifier for the physical item to establish that the other user still possesses the physical item.

17. The system of claim 14, wherein the information that unique identifies a particular piece of media comprises a combination of multiple different information sources physically placed on the piece of media including on packaging.

18. The system of claim 17, wherein the information that unique identifies a particular piece of media comprises at least an ID from a near-field communications device on the physical item and information from an image of the physical item.

* * * * *